United States Patent
Jeannard

(10) Patent No.: US 11,932,121 B2
(45) Date of Patent: Mar. 19, 2024

(54) POWER SUPPLY CONTROL SYSTEM AND METHOD

(71) Applicant: VEONEER SWEDEN AB, Vargarda (SE)

(72) Inventor: Jean-Francois Jeannard, Vargarda (SE)

(73) Assignee: VEONEER SWEDEN SAFETY SYSTEMS AB, Stockholm (SE)

( * ) Notice: Subject to any disclaimer, the term of this patent is extended or adjusted under 35 U.S.C. 154(b) by 0 days.

(21) Appl. No.: 17/312,505

(22) PCT Filed: Nov. 28, 2019

(86) PCT No.: PCT/EP2019/082926
§ 371 (c)(1),
(2) Date: Jun. 10, 2021

(87) PCT Pub. No.: WO2020/120152
PCT Pub. Date: Jun. 18, 2020

(65) Prior Publication Data
US 2022/0126696 A1    Apr. 28, 2022

(30) Foreign Application Priority Data
Dec. 10, 2018   (EP) .................................... 18211419

(51) Int. Cl.
*B60L 3/00*   (2019.01)
*B60L 50/60*  (2019.01)
*B60L 58/10*  (2019.01)

(52) U.S. Cl.
CPC ............. *B60L 3/0023* (2013.01); *B60L 50/60* (2019.02); *B60L 58/10* (2019.02); *B60L 2210/10* (2013.01)

(58) Field of Classification Search
CPC ........ B60L 3/0023; B60L 50/60; B60L 58/10; B60L 2210/10
(Continued)

(56) References Cited

U.S. PATENT DOCUMENTS 8,441,228 B2   5/2013   Brabec
8,541,905 B2   9/2013   Brabec
(Continued)

FOREIGN PATENT DOCUMENTS

DE   10 2011 006 761 A1   10/2012
EP   2 380 793 A1         10/2011
EP   3 144 186 A1         3/2017

OTHER PUBLICATIONS

International Search Report and Written Opinion of PCT/EP2019/082926, dated Feb. 5, 2020.

*Primary Examiner* — Rexford N Barnie
*Assistant Examiner* — Dru M Parries
(74) *Attorney, Agent, or Firm* — DICKINSON WRIGHT PLLC

(57) ABSTRACT

A power supply control system (1) for use in a vehicle, the system including: a first power control arrangement (2) incorporating at least two inputs (3, 4) and at least two outputs (5, 6); and a second power control arrangement (7) incorporating at least two inputs (8, 9) and at least two outputs (10, 11), each power control arrangement (2, 7) being configured to operate in an active mode or an isolated mode. In the active mode, the inputs and outputs of the power control arrangement (2, 7) are connected electrically to one another. In the isolated mode, the inputs and outputs of the power control arrangement (2, 7) are electrically isolated from one another. A selector arrangement (37) is configured to select the operating mode of the power control arrangements (2, 7) so that, at any one time, only one power
(Continued)

control arrangement (2, 7) operates in the active mode while the other power control arrangement (2, 7) operates in the isolated mode.

14 Claims, 7 Drawing Sheets

(58) Field of Classification Search
USPC .......................................................... 307/10.1
See application file for complete search history.

(56) References Cited

U.S. PATENT DOCUMENTS

| | | |
|---|---|---|
| 8,620,503 B2 | 12/2013 | Ito et al. |
| 9,102,241 B2 | 8/2015 | Brabec |
| 9,199,543 B2 | 12/2015 | Brabec |
| 9,525,291 B1 | 12/2016 | Huynh et al. |
| 9,694,697 B2 | 7/2017 | Brabec |
| 9,783,078 B2 | 10/2017 | Huynh et al. |
| 9,802,562 B2 | 10/2017 | Yasunori et al. |
| 2011/0025124 A1 | 2/2011 | Brabec |
| 2011/0025125 A1 | 2/2011 | Brabec |
| 2011/0025126 A1 | 2/2011 | Brabec |
| 2011/0288710 A1 | 11/2011 | Ito et al. |
| 2012/0068541 A1* | 3/2012 | Anderson ............... H02J 9/061 307/66 |
| 2013/0221897 A1 | 8/2013 | Brabec |
| 2013/0334878 A1 | 12/2013 | Brabec |
| 2017/0080883 A1 | 3/2017 | Yasunori et al. |
| 2017/0120770 A1 | 5/2017 | Huynh et al. |

* cited by examiner

POWER SUPPLY CONTROL SYSTEM AND METHOD

CROSS-REFERENCE TO RELATED APPLICATIONS

This application is a 35 U.S.C. § 371 national phase of PCT International PCT/EP2019/082926, filed Nov. 28, 2019, which claims the benefit of priority under 35 U.S.C. § 119 to European Patent Application No. 18211419.9, filed Dec. 10, 2018, the contents of which are incorporated herein by reference in their entirety.

FIELD OF THE INVENTION

The present invention relates to a power supply control system and method for use in a vehicle. More particularly, the present invention relates to a power supply control system and method for use with an electronic control unit in a vehicle.

BACKGROUND

It is known to provide two separate power sources, such as two separate batteries, within a motor vehicle for redundancy. In the event that one power source fails, the other power source can provide power within the vehicle. However, these conventional power supply arrangements are not necessarily optimised for use with an electronic control unit for a vehicle safety device where it is important that there is no interruption to the power supply. In these conventional power supply arrangements there is typically an interruption or variation in the power output when the arrangement switches between the power sources when one power source fails.

A further power supply problem can occur if the power input terminals of an electronic control unit become damaged, for instance during a crash situation. If the connection between the electronic control unit and the power supply arrangement is broken, the electronic control unit can no longer function correctly to control safety devices within a vehicle.

The present invention seeks to provide an improved power supply control system and method.

SUMMARY AND INTRODUCTORY DESCRIPTION OF PREFERRED EMBODIMENTS OF THE INVENTION

According to one aspect and embodiment of the present invention, there is provided a power supply control system for use in a vehicle, the system including: a first power control arrangement incorporating at least two inputs and at least two outputs; and a second power control arrangement incorporating at least two inputs and at least two outputs, each power control arrangement being configured to operate in an active mode or an isolated mode. In the active mode, the inputs and outputs of the power control arrangement are connected electrically to one another; and in the isolated mode, the inputs and outputs of the power control arrangement are electrically isolated from one another, wherein the system further includes: a selector arrangement which is configured to select the operating mode of the power control arrangements so that, at any one time, only one power control arrangement operates in the active mode while the other power control arrangement operates in the isolated mode.

In some embodiments, the system further includes: a DC/DC converter which incorporates inputs that are coupled to the outputs of the first and second power control arrangements.

In some embodiments, the system further includes: a first DC/DC converter which includes inputs that are coupled to the outputs of the first power control arrangement; and a second DC/DC converter which includes inputs that are coupled to the outputs of the second power control arrangement.

Preferably, each power control arrangement includes: a voltage input conductor and a voltage output conductor; a ground input conductor and a ground output conductor; a switching arrangement including: a first switch that is connected in series between the voltage input conductor and the voltage output conductor; and a second switch that is connected in series between the ground input conductor and the ground output conductor, wherein the switching arrangement is operable to configure the power control arrangement to operate in the active mode by closing the first and second switches or in the isolated mode by opening the first and second switches.

Conveniently, the system further includes: a control parameter input which is configured to receive a control parameter and to communicate the control parameter to the selector arrangement to configure the selector arrangement to select the operating mode of the power control arrangements.

Advantageously, the system further includes: an voltage sensor arrangement which is configured to sense a voltage across the inputs of the first and second power control arrangements and to provide a control parameter to the selector arrangement in response to the sensed voltage, such that in the event that the voltage sensing arrangement senses a reduction or absence in voltage across the inputs of one power control arrangement, the voltage sensing arrangement provides the control parameter to the selector arrangement to configure the other power control arrangement to operate in the active mode to provide a voltage across its outputs.

Preferably, the system further includes: a first cluster input module including inputs which are configured to be connected to a power source and outputs which are coupled to the inputs of the first power control arrangement; and a second cluster input module including inputs which are configured to be coupled to a power source and outputs which are coupled to the inputs of the second power control arrangement.

Conveniently, each cluster input module includes at least one of a fuse and a current limiter.

Advantageously, the inputs of the first and second cluster input modules are coupled to the same power source.

Preferably, the inputs of the first cluster input module are coupled to a first power source and the inputs of the second cluster input module are coupled to a second power source.

According to another aspect of embodiments of the present invention, there is provided an electronic control unit for use with a vehicle safety device, the electronic control unit including the system described hereinafter.

According to a further aspect of embodiments of the present invention, there is provided a method of supplying power within a vehicle, the method comprising including: providing a first power control arrangement incorporating at least two inputs and at least two outputs; providing a second power control arrangement incorporating at least two inputs and at least two outputs, each power control arrangement being configured to operate in an active mode or an isolated mode. In the active mode, the inputs and outputs of the power control arrangement are connected electrically to one another; and in the isolated mode, the inputs and outputs of the control arrangement are electrically isolated from one another, wherein the method further includes: selecting the operating mode of the power control arrangements so that, at any one time, only one power control arrangement operates in the active mode while the other power control arrangement operates in the isolated mode.

Preferably, each power control arrangement includes: a voltage input conductor and a voltage output conductor; a ground input conductor and a ground output conductor; a switching arrangement including: a first switch that is connected in series between the voltage input conductor and the voltage output conductor; and a second switch that is connected in series between the ground input conductor and the ground output conductor, and the method includes: configuring the power control arrangement to operate in the active mode by closing the first and second switches or in the isolated mode by opening the first and second switches.

Conveniently, the method further includes: receiving a control parameter at a control parameter input and communicating the control parameter to the selector arrangement to configure the selector arrangement to select the operating mode of the power control arrangements.

Advantageously, the method further includes: sensing a reduction or absence in voltage across the inputs of the first or second power control arrangements; and providing a control parameter to the selector arrangement in response to the sensed voltage or absence of a voltage.

BRIEF DESCRIPTION OF THE DRAWINGS

So that the present invention may be more readily understood, embodiments of the present invention will now be described, by way of example, with reference to the accompanying drawings, in which.

DETAILED DESCRIPTION

Figure 1:
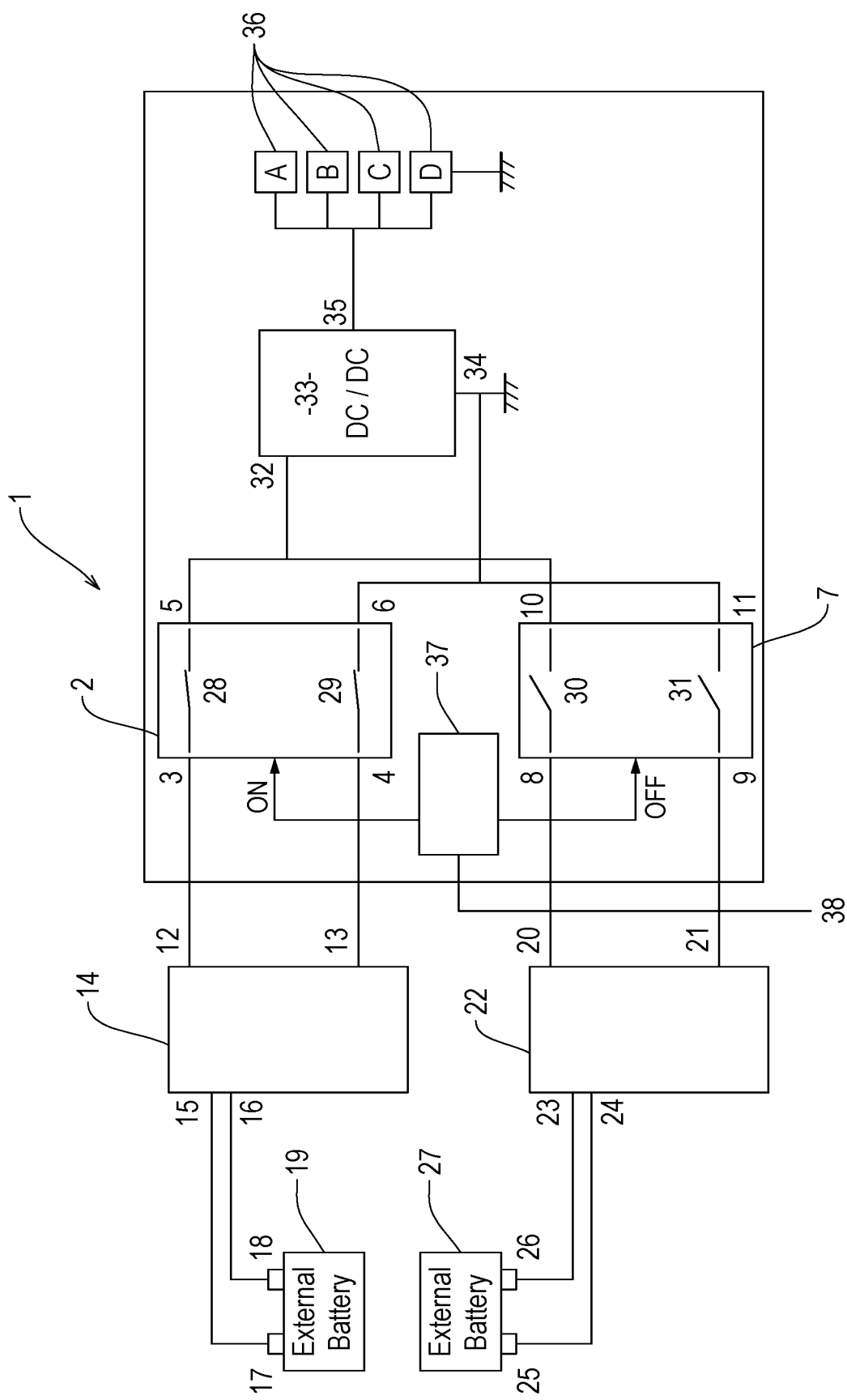
FIG. 1 is a schematic diagram of a power supply control system of one embodiment.

Referring initially to FIG. 1 of the accompanying drawings, a power supply control system 1 includes a first power control arrangement 2 which incorporates at least two inputs in the form of a voltage input 3 and a ground input 4. The first power control arrangement 2 further includes at least two outputs in the form of a voltage output 5 and a ground output 6. In some embodiments, the power supply control system 1 is an electronic control unit (ECU) for use in a vehicle.

The system 1 further includes a second power control arrangement 7 incorporating at least two inputs in the form of a voltage input 8 and a ground input 9. The second power control arrangement 7 further incorporates at least two outputs in the form of a voltage output 10 and a ground output 11.

The inputs 3, 4 are coupled electrically to respective outputs 12, 13 of a first cluster input module 14. The first cluster input module 14 includes inputs 15, 16 which are coupled electrically to terminals 17, 18 of a first power source in the form of a first battery 19 (or another electrical potential source).

The inputs 8, 9 of the second power control arrangement 7 are coupled electrically to respective outputs 20, 21 of a second cluster input module 22. The second cluster input module 22 includes inputs 23, 24 which are coupled electrically to terminals 25, 26 of a second power source in the form of a second battery 27 (or another electrical potential source).

Each of the cluster input modules 14, 22 includes at least one of a fuse and a current limiter (not shown). The fuse or the current limiter in each cluster input module 14, 22 protect the power supply control arrangements 2, 7 and any electrical components connected to the power control arrangements 2, 7 by limiting or preventing excess current from damaging the power supply control arrangements 2, 7 or any electrical components connected to the power control arrangements 2, 7.

The first power supply control arrangement 2 incorporates a switching arrangement which includes a first switch 28 that is connected in series between the first voltage input 3 and the first voltage output 5 and a second switch 29 which is connected in series between the first ground input 4 and the first ground output 6.

The second power control arrangement 7 incorporates a switching arrangement which includes a first switch 30 that is connected in series between the second voltage input 8 and the second voltage output 10 and a second switch 31 which is connected in series between the second ground input 9 and the second ground output 11.

In this embodiment, the first voltage output 5 of the first power control arrangement 2 is coupled electrically to the second voltage output 10 of the second power control arrangement 7 and to a voltage input 32 of a converter module in the form of a DC/DC converter 33. The first ground output 6, the second ground output 11 and a ground connector 34 of the DC/DC converter 33 are coupled electrically to the main ground of the power supply system 1.

The DC/DC converter 33 provides an output 35 which is coupled electrically to at least one or a plurality of device outputs 36. In this embodiment, the device outputs 36 are configured to be coupled electrically to one or more other components within a vehicle, such as a safety device, a regulator, a processor or a circuit on a printed circuit board of the power supply system 1.

In this embodiment, the power supply system 1 further includes a selector arrangement 37 which is coupled electrically to each of the power control arrangements 2, 7. The selector arrangement 37 is configured to select an operating mode of each of the power control arrangements 2, 7. In some embodiments, the selector arrangement 37 is configured to select an operating mode of each of the power control arrangements 2, 7 in response to a control parameter.

In this embodiment, each power control arrangement 2, 7 is configured to operate in an active mode or an isolated mode.

The first power control arrangement 2 is configured to operate in the active mode when the switches 28, 29 are closed so that the first voltage input 3 is connected electrically to the first voltage output 5 and the first ground input 4 is connected electrically to the first ground output 6. The first power control arrangement 2 is configured to operate in the isolated mode when the switches 28, 29 are open so that the inputs 3, 4 are electrically isolated from the device outputs 5, 6.

The second power control arrangement 7 is configured to operate in the active mode when the switches 30, 31 are closed such that the second voltage input 8 is connected electrically to the second voltage output 10 and the second ground input 9 is connected electrically to the second ground output 11. The second power control arrangement 7 is configured to operate in the isolated mode when the switches 30, 31 are open such that the inputs 8, 9 are electrically isolated from the outputs 10, 11.

In this embodiment, the selector arrangement 37 is configured to control the switches 28, 29 and 30, 31 in the power control arrangements 2, 7 to open or close to configure the power control arrangements 2, 7 to operate in the active mode or the isolated mode. FIG. 1 shows the first power control arrangement 2 being configured in the active mode and the second power control arrangement 7 being configured in the isolated mode.

In this embodiment, the selector arrangement 37 is configured to receive a control parameter in the form of a control signal via a control input 38. In this embodiment, the control signal is provided to the control input 38 from an external control unit. The control signal controls the selector arrangement 37 to select which of the power control arrangements 2, 7 is to operate in the active mode and which is to operate in the isolated mode. The selector arrangement 37 is configured to control the power control arrangements 2, 7 such that, at any one time, only one power control arrangement 2, 7 operates in the active mode while the other power control arrangement 2, 7 operates in the isolated mode.

When the system is operating normally, with both the first and second batteries 19, 27 providing power to the first and second power control arrangements 2, 7 via the cluster input modules 14, 22, the selector arrangement 37 configures one power control arrangement 2, 7 to operate in the active mode and the other power control arrangement 2, 7 to operate in the isolated mode.

The power control arrangement 2, 7 that is in the active mode provides power to the inputs 32, 34 of the DC/DC converter 33 to power the DC/DC converter 33 and in turn power the electronic control unit and any electrical devices connected to the device outputs 36.

The power control arrangement 2, 7 that is in the isolated mode does not provide any power to the DC/DC converter 33. The open switches of the isolated power control arrangement 2, 7 prevent current reinjection between the outputs and inputs of one power control arrangement 2, 7 and the outputs and inputs of the other power control arrangement 2, 7.

In the event that one of the batteries 1 (or other sources of electrical potential) 19, 27 fails or if there is a failure in the electrical coupling between one of the batteries 19, 27 and the inputs of one of the power control arrangements 2, 7, the selector arrangement 37 configures the power control arrangements 2, 7 so that the active power control arrangement 2, 7 switches to the isolated mode and the isolated power control arrangement 2, 7 switches to the active mode. This switch in the mode of operation of each of the power control arrangements 2, 7 enables the other battery 19, 27 to provide power to the DC/DC converter 33 to enable the DC/DC converter 33 to continue to provide power to the device outputs 36. This switch in the mode of operation of each of the power control arrangements 2, 7 preferably occurs such that there is no interruption in the power provided to the DC/DC converter 33 and hence no interruption in the power output from the DC/DC converter 33 to the device outputs 36.

The selector arrangement 37 is further configured to switch the configuration of the power control arrangements 2, 7 again if there is a need to switch back to the original battery 19, 27, for instance if the original failed battery is re-charged or replaced with a functioning battery.

Figure 2:
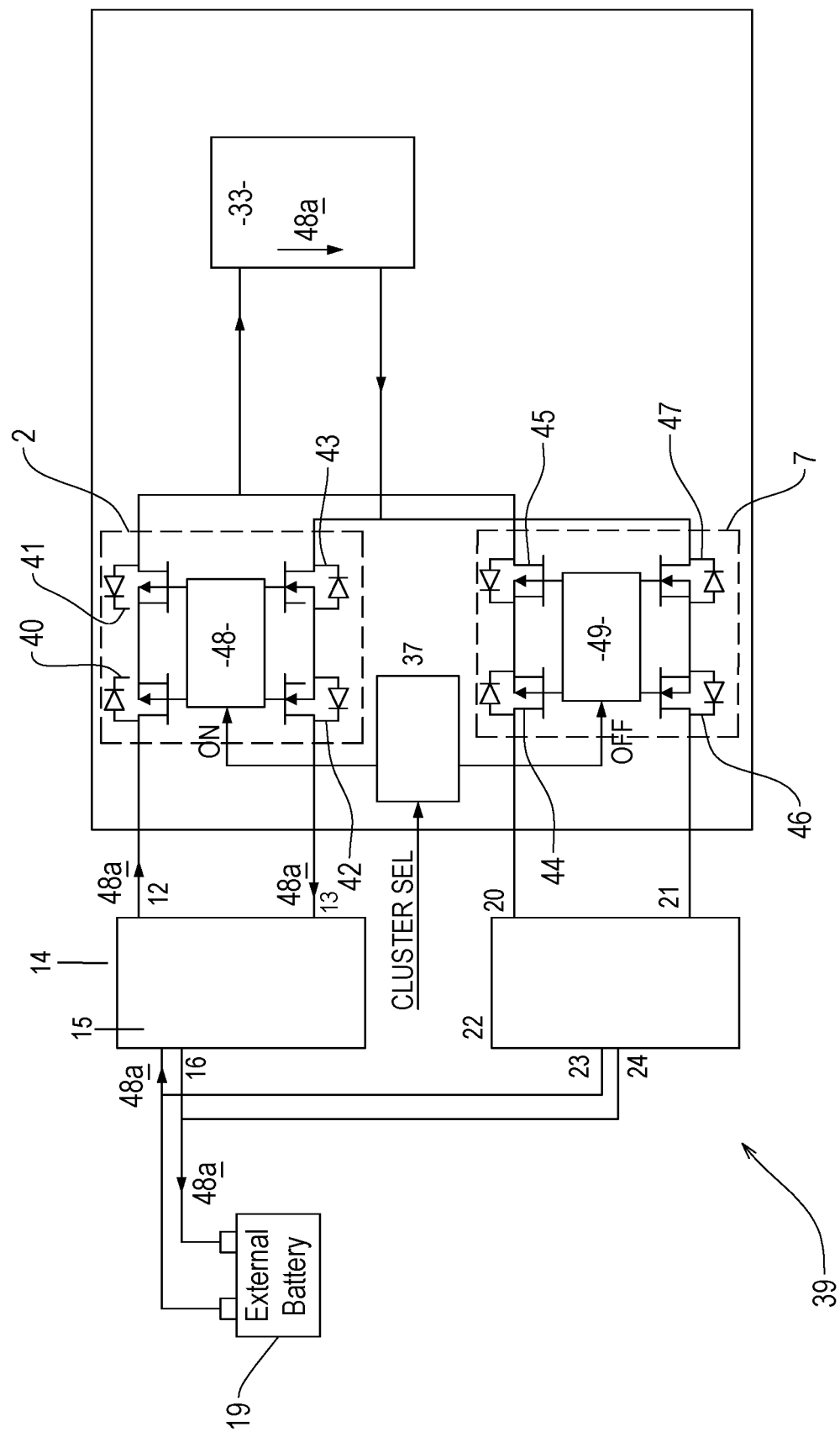
FIG. 2 is a schematic diagram showing the operation of a power control system of one embodiment in a first operating mode.

Referring now to FIG. 2 of the accompanying drawings, a power supply control system 39 of a further embodiment includes many of the same components as the system 1 of the embodiments described above. However, in this embodiment, the power supply control system 39 includes a single battery 19 in place of the two batteries 19, 27 of the embodiment described above.

In this embodiment, the single battery 19 is coupled electrically to the inputs 15, 16, 23, 24 of both cluster input modules 14, 22. The cluster input modules 14, 22 therefore provide a current limiting or current blocking function for each power control arrangement 2, 7 and the DC/DC converter and the components connected to the DC/DC converter to protect these components from excessive current from the single battery 19.

In the power control system 39 of this embodiment, the switching arrangement in each power control arrangement 2, 7 includes pairs of switches 40-47 in place of the switches 28-31 of the embodiment described above. Each power control arrangement 2, 7 includes a driver circuit 48, 49 which is coupled to control the transistors 40-47 to operate as switches that can effectively be opened or closed to electrically connect the inputs to the outputs of each power control arrangement 2, 7.

In FIG. 2, the transistors 40-43 of the first power control arrangement 2 are switched on by the driver circuit 48 to permit current to flow from the battery 19, through the cluster input module 14, the first power control arrangement 2 and the DC/DC converter 33, as shown by the arrows 48*a*. In this configuration, the first power control arrangement 2 is operating in the active mode, whereas the second power control arrangement 7 is operating in the isolated mode.

Figure 3:
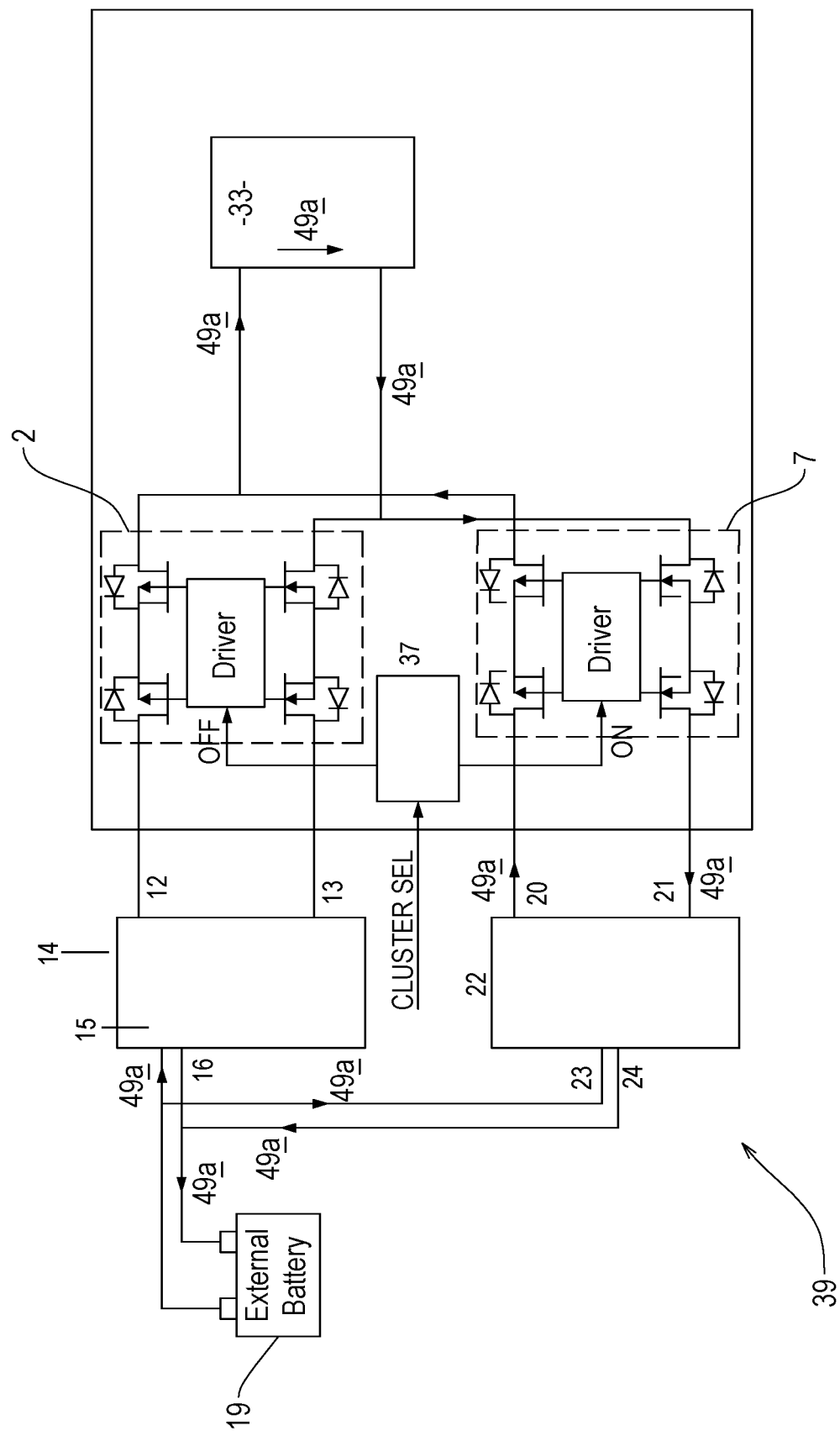
FIG. 3 is a schematic diagram of a power control system of one embodiment in a second operating mode.

Referring now to FIG. 3 of the accompanying drawings, the operating modes of the first and second power control arrangements 2, 7 may be switched by the selector arrangement 37 in response to a control parameter provided at the control input 38. The selector arrangement 37 provides signals to the driver circuits 48, 49 in each of the power control arrangements 2, 7 to control the switches 40-47 so that the switches 40-43 in the first power control arrangement 2 are switched off and the switches 44-47 in the second power control arrangement 47 are switched on. When the second power control arrangement 7 is in the active mode, current flows from the battery 19, through the second cluster input module 22, the second power control arrangement 7 and the DC/DC converter 33 to power the components connected to the DC/DC converter 33, as indicated by arrows 49*a* in FIG. 3.

Figure 4:
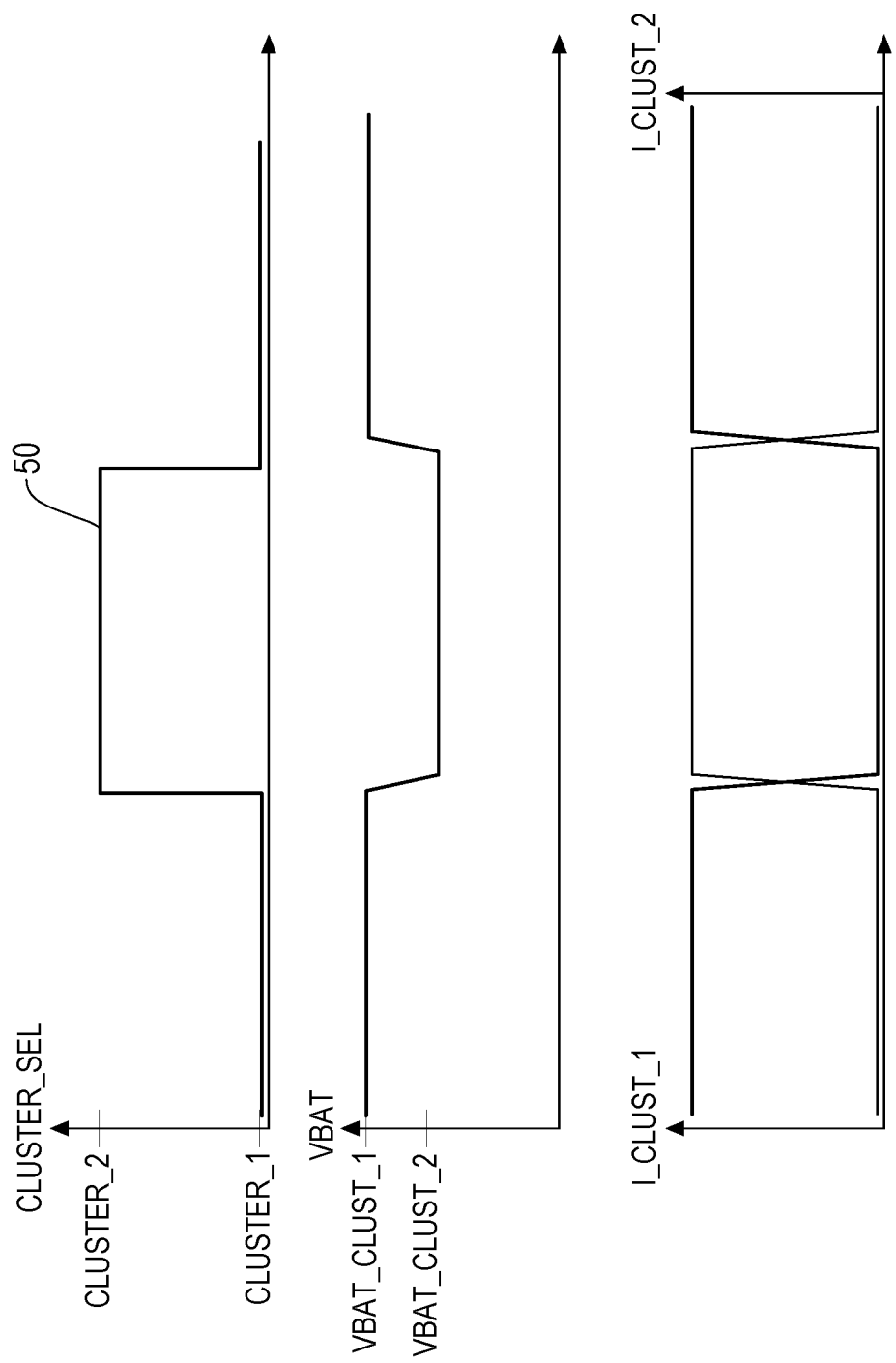
FIG. 4 is a timing diagram showing signal levels within a power supply control system when the power control system is switching between operating modes.

FIG. 4 of the accompanying drawings shows the voltages and currents within the power control system of some embodiments when a control parameter (CLUSTER_SEL) in the form of a control signal 50 switches between a low voltage and a high voltage. In some embodiments, the control signal 50 is a voltage which is provided by an external control arrangement.

The switching of the control signal 50 between the low voltage and the high voltage causes the selector arrangement 37 to configure one power control arrangement 2, 7 to operate in the active mode and the other power control arrangement 2, 7 to operate in the isolated mode.

In the example shown in FIG. 4, when the control signal 50 is at the low voltage (CLUSTER_1), the first power control arrangement 2 operates in the active mode and the second power control arrangement 7 operates in the isolated mode. In this configuration, first power control arrangement 2 provides a voltage (VBAT_CLUST_1) and a current (I_CLUST_1) to the DC/DC converter 33.

When the control signal 50 switches to the high voltage (CLUSTER_2), the first power control arrangement 2 switches to operate in the isolated mode and the second power control arrangement 7 switches to operate in the active mode. In this configuration, second power control arrangement 7 provides a voltage (VBAT_CLUST_2) and a current (I_CLUST_2) to the DC/DC converter 33.

In the final stage of the sequence illustrated in FIG. 4, the control signal 50 switches back to the first configuration where the first power control arrangement provides a voltage (VBAT_CLUST_1) and a current (I_CLUST_1) to the DC/DC converter 33.

Figure 5:
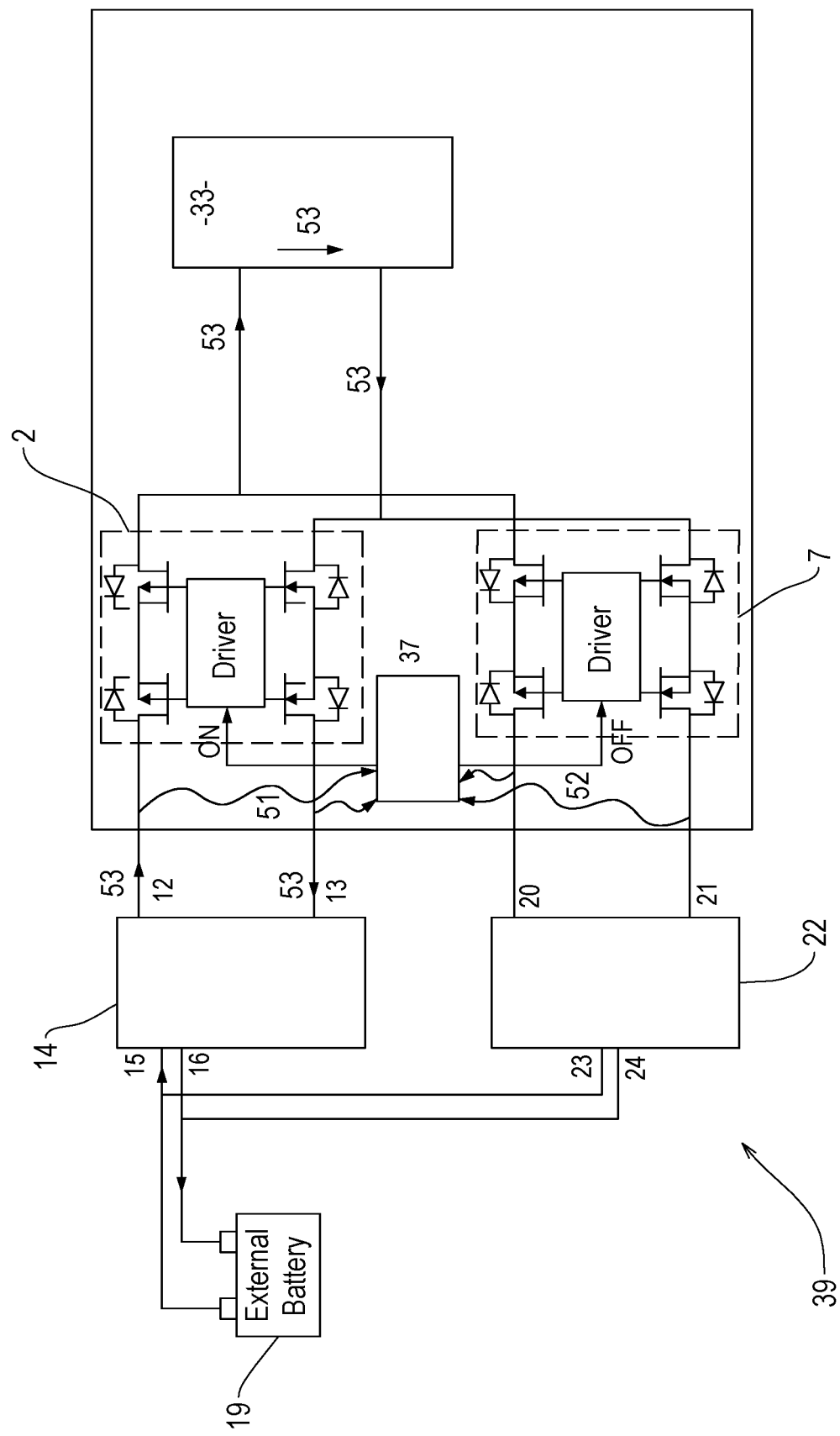
FIG. 5 is a schematic diagram of a power control system of one embodiment during operation.

Referring now to FIG. 5 of the accompanying drawings, in a further embodiment, the selector arrangement 37 includes a voltage sensing arrangement which is configured to sense whether there is a voltage across the inputs 3, 4 of the first power control arrangement or across the inputs 8, 9 of the second power control arrangement 7. This voltage sensing function is indicated generally by arrows 51, 52 in FIG. 5.

Figure 6:
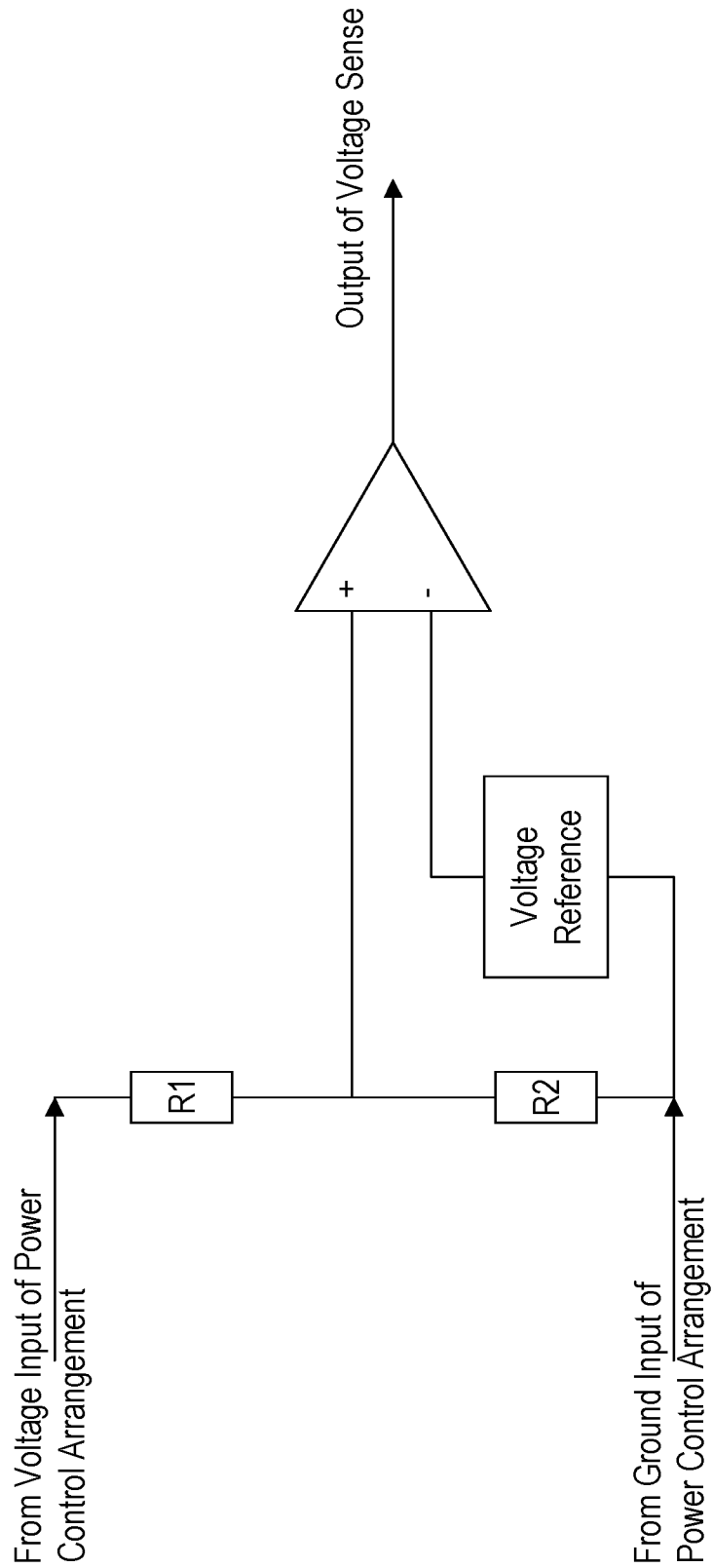
FIG. 6 is a circuit diagram of a voltage sensing arrangement of some embodiments.

In some embodiments, the voltage sensing arrangement is implemented with the circuit or a functionally equivalent circuit to the circuit shown in FIG. 6 of the accompanying drawings. The voltage sensing circuit shown in FIG. 6 includes voltage and ground inputs which are connected respectively to the voltage and ground inputs 3, 4 of the first power control arrangement 2. The voltage sensing circuit includes a potential (voltage) divider which is formed by two resistors R1 and R2 having an output which is connected to the non-inverting input of a comparator. A reference voltage is provided at the inverting input of the comparator. In use, the comparator compares the voltage output from the potential divider with the reference voltage and provides a voltage sense output which is indicative of a reduction or absence in voltage across the inputs 3, 4 of the first power control arrangement 2.

In some embodiments, the power supply control system 1 includes an alternative circuit to the circuit shown in FIG. 6 but which provides an equivalent function to sense the voltage across the inputs 3, 4 of the power control arrangement 2. Functionally equivalent circuits would be familiar to those skilled in the art.

The same circuit or a functionally equivalent circuit to the circuit show in FIG. 6 may be connected across the inputs 8, 9 of the second power control arrangement 7 to sense a reduction or absence in voltage across the inputs 8, 9 of the second power control arrangement 7.

The selector arrangement 37 is configured to select which power control arrangement 2, 7 is to operate in the active mode and which power control arrangement 2, 7 is to operate in the isolated mode based on the sensed voltages 51, 52. The selector arrangement 37 is configured to select the active or isolated modes of operation automatically so that there is always power supplied to the DC/DC converter if there is a voltage across one or both of the outputs 12, 13 or 20, 21 of the first or second cluster input modules 14, 22.

FIG. 5 shows the configuration of the system with the first power control arrangement 2 in the active mode and the second power control arrangement 7 in the isolated mode. Current flows from the battery 19 through the first power control arrangement 2 and the DC/DC converter 33 as indicated generally by arrows 53.

In the event that the selector arrangement 37 detects a voltage present across the outputs 12, 13 of the first cluster input module 14 and the outputs 20, 21 of the second cluster input module 22, the selector arrangement 37 is configured to default to configuring the first power control arrangement 2 to operate in the active mode and the second power control arrangement 7 to operate in the isolated mode, as shown in FIG. 5. If there is a failure in the first cluster input module 14 or the power supply connection to the first power control arrangement 2, the selector arrangement 37 detects the reduction in voltage or absence of voltage applied across the input 3, 4 of the first power control arrangement 2 and switches the modes of operation such that the second power control arrangement 7 operates in the active mode and the first power control arrangement 2 operates in the isolated mode.

The power supply control system 39 is shown in FIG. 5 in operation with a single battery 19. However, it is to be appreciated that the embodiment would function in the same way with two batteries, such as the two batteries 19, 27 of the embodiment shown in FIG. 1.

Figure 7:
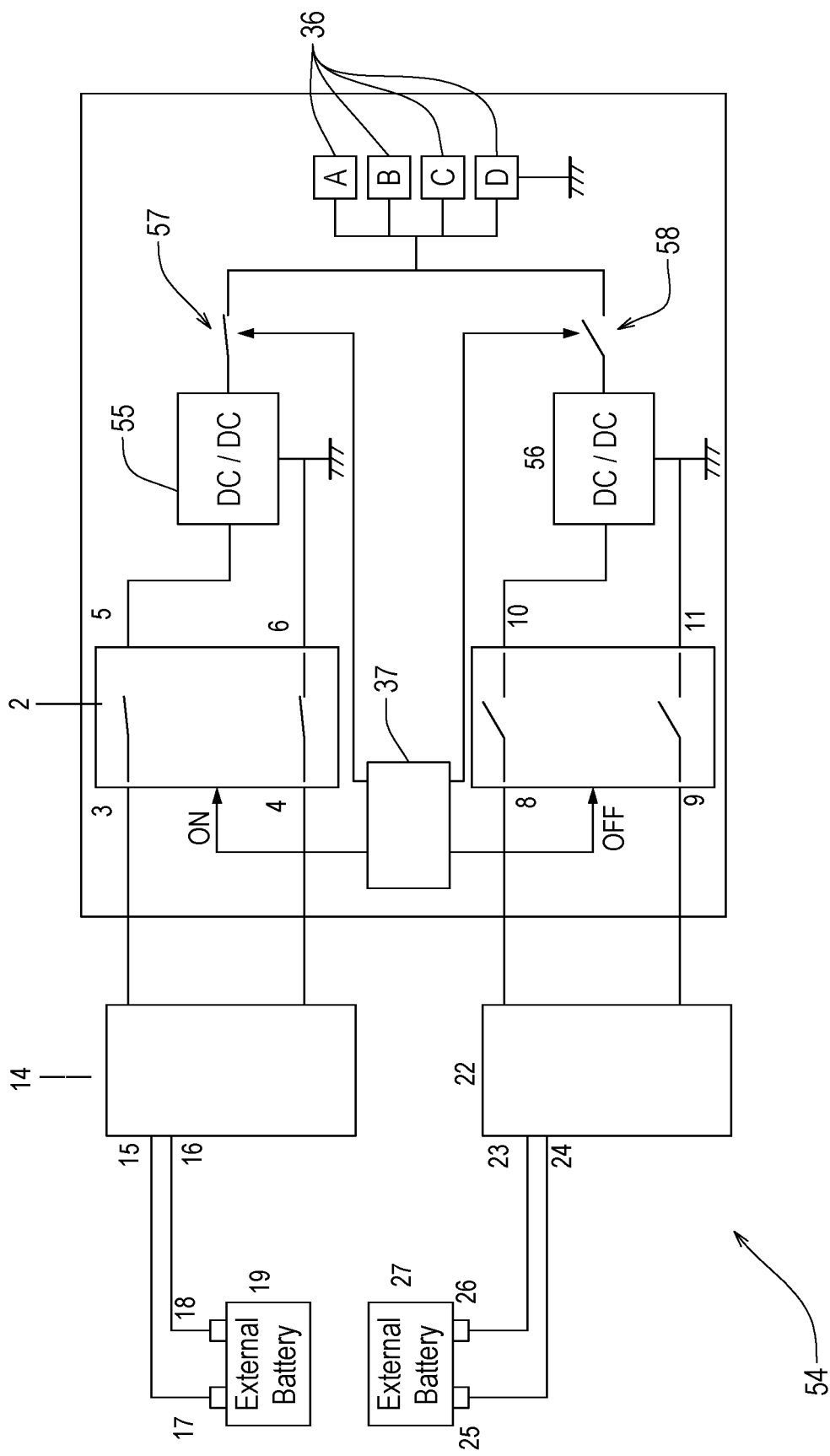
FIG. 7 is a schematic diagram of a power control system of a further embodiment which includes two DC/DC converters.

Referring now to FIG. 7 of the accompanying drawings, a power supply control system 54 of a further embodiment includes many of the same components as the embodiments described above and the same reference numbers will be used for the same components in each embodiment. In this power supply control system 54, the system includes two DC/DC converters 55, 56 in place of the single DC/DC converter 33 of the embodiments described above.

A first DC/DC converter 55 is coupled electrically to the outputs 5, 6 of the first power control arrangement 2 and a second DC/DC converter 56 is coupled to the outputs 10, 11 of the second power control arrangement 7. Additionally, a DC/DC converter output switch 57, 58 is provided in series with the voltage output from each respective DC/DC converter 55, 56. The DC/DC converter output switches 57, 58 are configured to be controlled by the selector arrangement 37 so that the output of each DC/DC converter 55, 56 is electrically disconnected from the device outputs 36 when the power control arrangement 2, 7 which is connected to the DC/DC converter 55, 56 is in the isolated mode.

The power supply control system 54 of this embodiment is provided with two DC/DC converters 55, 56 for redundancy so that one DC/DC converter 55, 56 can be selected for operation in the event of the failure of the other DC/DC converter 55, 56.

The power supply control systems of the embodiments described above seek to provide a stable power supply for an electronic control unit or other electronic components connected to the device outputs of the power supply control system. The power control arrangements are configured to switch between the active mode and the isolated mode such that the power supply control system can provide power to an electronic control unit or other electronic components within a vehicle continuously without interruption.

In some embodiments, at least some of the components of the power supply control systems are integrated within an electronic control unit. In some embodiments, the power control arrangements, the selector arrangement and the DC/DC converters are integrated within an electronic control unit. In these embodiments, the multiple power input to the electronic control units that provide power to each of the power control arrangements provide redundancy to permit power to be input to the electronic control unit from one of the cluster input modules in the event that the connection between the other cluster input module and the electronic control unit is damaged, for instance during a crash situation.

When used in this specification, the term "includes" and "including" and variations thereof mean that specified features, steps or integers and included. The terms are not to be interpreted to exclude the presence of other features, steps or compounds.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realising the invention in diverse forms thereof.

While the above description constitutes the preferred embodiment of the present invention, it will be appreciated that the invention is susceptible to modification, variation and change without departing from the proper scope and fair meaning of the accompanying claims.

The invention claimed is:

1. A power supply control system for use in a vehicle, the system comprising:
    a first power control arrangement incorporating at least two first inputs and at least two first outputs and being operable in an active mode or in an isolated mode, wherein each input of the at least two first inputs is electrically connected to a corresponding one of the at least two first outputs in the active mode, and each first input of the at least two first inputs is electrically isolated from the corresponding one of the at least two first outputs in the isolated mode; and
    a second power control arrangement incorporating at least two inputs second and at least two second outputs and being operable in an active mode or an isolated mode, wherein each input of the at least two second inputs is electrically connected to a corresponding one of the at least two second outputs in the active mode, and each second input of the at least two second inputs is electrically isolated from the corresponding one of the at least two second outputs in the isolated mode,
    wherein the system further comprises:
    a selector arrangement which is configured to select the active mode and the isolated mode of each of the first and second power control arrangements so that, at any one time, only one of the first and second power control arrangement operates in the active mode while the other of the first and second power control arrangement operates in the isolated mode;
    a first DC/DC converter which comprises inputs that are coupled to the first outputs of the first power control arrangement;
    a second DC/DC converter which comprises inputs that are coupled to the second outputs of the second power control arrangement;
    a first output switch selectively connecting an output the first DC/DC converter and at least one device output configured to be electrically coupled to a component within a vehicle;
    a second output switch selectively connecting an output the second DC/DC converter and the at least one device output; and
    wherein the selector arrangement is further configured to control each of the first output switch and the second output switch to isolate a corresponding one of the first DC/DC converter and the second DC/DC converter from the at least one device output when the corresponding one of the first power control arrangement and the second power control arrangement is in the isolated mode.

2. The system of claim 1, wherein the system further comprises:
    a DC/DC converter having inputs that are coupled to the first outputs of the first power control arrangement and to the second outputs of the second power control arrangement.

3. The system of claim 1, wherein each of the first and second power control arrangement comprises:
    a voltage input conductor and a voltage output conductor;
    a ground input conductor and a ground output conductor;
    a switching arrangement comprising:
    a first switch that is connected in series between the voltage input conductor and the voltage output conductor; and
    a second switch that is connected in series between the ground input conductor and the ground output conductor, wherein the switching arrangement is operable to configure the power control arrangement to operate in the active mode by closing the first and second switches or in the isolated mode by opening the first and second switches.

4. The system of claim 1, wherein the system further comprises:
    a control parameter input which is configured to receive a control parameter and to communicate the control parameter to the selector arrangement to configure the selector arrangement to select the operating mode of the first and second power control arrangements.

5. The system of claim 1, wherein the system further comprises:
    a first cluster input module comprising third inputs which are configured to be connected to a first power source and third outputs which are coupled to the first inputs of the first power control arrangement; and
    a second cluster input module comprising fourth inputs which are configured to be coupled to the first power source or a second power source and fourth outputs which are coupled to the second inputs of the second power control arrangement.

6. The system of claim 5, wherein each of the first and second cluster input modules comprises at least one of a fuse and a current limiter.

7. The system of claim 5, wherein the third inputs of the first cluster input module and the fourth inputs of the second cluster input module are coupled to a same one of the first or second power sources.

8. The system of claim 5, wherein the third inputs of the first cluster input module are coupled to the first power source and the fourth inputs of the second cluster input module are coupled to the second power source.

9. An electronic control unit for use with a vehicle safety device, the electronic control unit comprising the system of claim 1.

10. A power supply control system for use in a vehicle, the system comprising:

a first power control arrangement incorporating at least two first inputs and at least two first outputs and being operable in an active mode or in an isolated mode, wherein each input of the at least two first inputs is electrically connected to a corresponding one of the at least two first outputs in the active mode, and each first input of the at least two first inputs is electrically isolated from the corresponding one of the at least two first outputs in the isolated mode; and a second power control arrangement incorporating at least two inputs second and at least two second outputs and being operable in an active mode or an isolated mode, wherein each input of the at least two second inputs is electrically connected to a corresponding one of the at least two second outputs in the active mode, and each second input of the at least two second inputs is electrically isolated from the corresponding one of the at least two second outputs in the isolated mode, wherein the system further comprises:

a selector arrangement which is configured to select the active mode and the isolated mode of each of the first and second power control arrangements so that, at any one time, only one of the first and second power control arrangement operates in the active mode while the other of the first and second power control arrangement operates in the isolated mode;

a first DC/DC converter which comprises inputs that are coupled to the first outputs of the first power control arrangement;

a second DC/DC converter which comprises inputs that are coupled to the second outputs of the second power control arrangement;

a first output switch selectively connecting an output the first DC/DC converter and at least one device output configured to be electrically coupled to a component within a vehicle;

a second output switch selectively connecting an output the second DC/DC converter and the at least one device output;

wherein the selector arrangement is further configured to control each of the first output switch and the second output switch to isolate a corresponding one of the first DC/DC converter and the second DC/DC converter from the at least one device output when the corresponding one of the first power control arrangement and the second power control arrangement is in the isolated mode; and a voltage sensor arrangement which is configured to sense a voltage across the inputs of each of the first and second power control arrangements and to provide a control parameter to the selector arrangement in response to the sensed voltage, such that in the event that the voltage sensing arrangement senses a reduction or absence in voltage across the inputs of one of the first and second power control arrangement, the voltage sensing arrangement provides the control parameter to the selector arrangement to configure the other of the first and second power control arrangement to operate in the active mode to provide a voltage across its outputs.

11. A method of supplying power within a vehicle, the method comprising:

providing a first power control arrangement incorporating at least two first inputs and at least two first outputs and being operable in an active mode or in an isolated mode, wherein each input of the at least two first inputs is electrically connected to a corresponding one of the at least two first outputs in the active mode, and each first input of the at least two first inputs is electrically isolated from the corresponding one of the at least two first outputs in the isolated mode;

providing a second power control arrangement incorporating at least two second inputs and at least two second outputs and being operable in an active mode or an isolated mode, wherein each input of the at least two second inputs is electrically connected to a corresponding one of the at least two second outputs in the active mode, and each second input of the at least two second inputs is electrically isolated from the corresponding one of the at least two second outputs in the isolated mode; and wherein the method further comprises:

selecting, by a selector arrangement, the operating mode of each of the first and second power control arrangements so that, at any one time, only one of the first and second power control arrangement operates in the active mode while the other of the first and second power control arrangement operates in the isolated mode;

receiving, by a first DC/DC converter, power from first outputs of the first power control arrangement; receiving, by a second DC/DC converter, power from the second outputs of the second power control arrangement;

selectively connecting, by a first output switch, an output the first DC/DC converter and at least one device output configured to be electrically coupled to a component within a vehicle; and selectively connecting, by a second output switch, an output the second DC/DC converter and the at least one device output; and wherein the selector arrangement is further configured to control each of the first output switch and the second output switch to isolate a corresponding one of the first DC/DC converter and the second DC/DC converter from the at least one device output when the corresponding one of the first power control arrangement and the second power control arrangement is in the isolated mode.

12. The method of claim 11, wherein each of the first and second power control arrangements comprises:

providing a voltage input conductor and a voltage output conductor;

providing a ground input conductor and a ground output conductor;

providing a switching arrangement comprising:

a first switch that is connected in series between the voltage input conductor and the voltage output conductor; and a second switch that is connected in series between the ground input conductor and the ground output conductor, and configuring the first and second power control arrangements to operate in the active mode by closing the first and second switches or in the isolated mode by opening the first and second switches.

13. The method of claim 11, wherein the method further comprises:

receiving a control parameter at a control parameter input and communicating the control parameter to the selector arrangement to configure the selector arrangement to select the operating mode of the first and second power control arrangements.

14. The method of claim 11, wherein the method further comprises:
sensing a reduction or absence in voltage across the inputs of the first or second power control arrangements; and
providing a control parameter to the selector arrangement in response to the sensed voltage or absence of a voltage.

* * * * *